United States Patent Office 3,049,559
Patented Aug. 14, 1962

3,049,559
UREAS
Stewart R. Montgomery, El Dorado, Ark., assignor to Monsanto Chemical Company, St. Louis, Mo., a corporation of Delaware
No Drawing. Filed Dec. 20, 1957, Ser. No. 704,005
10 Claims. (Cl. 260—448.2)

This invention relates to silicon-containing ureas and to the method for their preparation.

It is an object of this invention to provide a new class of silicon-containing ureas having utility as antifoam agents. Other objects will become apparent from the description of the invention.

The novel ureas of this invention are represented by the following formula:

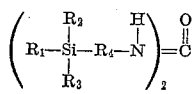

Formula I wherein $R_1$ represents an aryl radical, $R_2$ and $R_3$ represent alkyl or aryl radicals and $R_4$ represents an alkylene radical. The ureas of this invention are prepared by reacting, preferably at an elevated temperature, carbonyl sulfide and a monoprimary amine having the formula

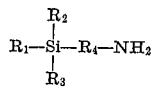

Formula II wherein $R_1$ represents an aryl radical, $R_2$ and $R_3$ represent alkyl or aryl radicals and $R_4$ represents an alkylene radical. The following examples are illustrative of this invention:

Example I

A mixture of 0.2 mol of dimethylphenylsilylmethylamine and 20 ml. of dry toluene and a Teflon-covered stirring bar were placed in a one-liter, stainless-steel pressure reaction vessel. The reactor was charged to 100 p.s.i.g. with carbonyl sulfide (0.24 mol) at 25° C. The mixture was stirred and heated at 100° C. under a pressure of 130 p.s.i.g. for four hours. After cooling the vessel and venting the gases present, the residual liquid was partially evaporated on a steam bath. On cooling, crystals of 1,3-bis(dimethylphenylsilylmethyl)urea separated and were recovered. Two recrystallizations of this material from ethanol yielded substantially pure 1,3-bis(dimethylphenylsilylmethyl)urea having a melting point of 131°–132° C. and the following analysis:

|  | C, percent | H, percent | N, percent | Si, percent |
|---|---|---|---|---|
| Calculated for $C_{19}H_{28}N_2OSi_2$ | 64.00 | 7.91 | 7.86 | 15.74 |
| Found | 64.14 | 7.84 | 7.65 | 15.79 |

Example II

The procedure set forth in Example I is repeated using as the amine, 4-chlorophenyl-dimethylsilylmethylamine. An excellent yield of 1,3-bis(4-chlorophenyl-dimethylsilylmethyl)urea was obtained having a melting point of 143°–144° C. and the following analysis:

|  | C, percent | H, percent | N, percent | Cl, percent | Si, percent |
|---|---|---|---|---|---|
| Calculated for $C_{19}H_{26}N_2Cl_2OSi_2$ | 53.63 | 6.16 | 6.59 | 16.67 | 13.19 |
| Found | 53.64 | 6.17 | 6.51 | 16.56 | 13.06 |

Example III

The procedure set forth in Example I is repeated using as the amine, diphenylmethylsilylmethylamine. An excellent yield of 1,3-bis(diphenylmethylsilylmethyl)urea was obtained having a melting point of 178°–179° C. and the following analysis:

|  | C, percent | H, percent | N, percent | Si, percent |
|---|---|---|---|---|
| Calculated for $C_{29}H_{32}N_2OSi_2$ | 72.46 | 6.71 | 5.83 | 11.67 |
| Found | 72.54 | 6.57 | 6.01 | 11.71 |

Example IV

The procedure set forth in Example I is repeated using as the amine, triphenylsilylmethylamine. An excellent yield of 1,3-bis(triphenylsilylmethyl)urea is obtained.

Example V

The procedure set forth in Example I is repeated using as the amine, β-di(2-nitrophenyl)-phenylsilylpropylamine. An excellent yield of 1,3-bis[β-di(2-nitrophenyl)-phenylsilylpropyl]urea is obtained.

Example VI

The procedure set forth in Example I is repeated using as the amine, β-dinaphthyl-4-hydroxyphenylsilylbutylamine. An excellent yield of 1,3-bis(dinaphthyl-4-hydroxy-phenylsilylbutyl)urea is obtained.

The novel ureas of this invention have utility as antifoam agents. As an illustration of this utility, 10 ml. of a liquid ionic detergent were shaken to produce a sizeable foam. To this foam was added 0.2 ml. of an ethanolic solution of 1,3-bis(dimethylphenylsilylmethyl)urea. The foam was thereby substantially destroyed.

The ureas of this invention are represented by the foregoing Formula I in which $R_1$ represents an aryl radical, $R_2$ and $R_3$ represent alkyl or aryl radicals and $R_4$ represents an alkylene radical. These radicals can be unsubstituted or substituted with one or more substituent groups which include halogens, nitro, hydroxy, sulfate, sulfonate, etc. radicals. Preferred ureas are those in which the alkyl and alkylene radicals contain from 1 to 18 carbon atoms.

The process for the preparation of the ureas of this invention can be substantially varied. The reaction between the carbonyl sulfide and the amine, as represented by Formula II, is preferably carried out at an elevated temperature. Temperatures in the range of from about 70° C. to about 150° C. are particularly useful. It is preferred that the reaction be carried out at superatmospheric pressures although atmospheric pressures can be used. The ratio of reactants can be substantially varied although best results are obtained when carbonyl sulfide is used in excess of the stoichiometric amount required. The reaction can be carried out in an inert solvent medium or in the absence of a solvent. After the reaction is complete, the urea can be recovered from the reaction mixture by any method well known to those skilled in the art.

The amines used in the process of this invention can be prepared by amination of the corresponding halogen compound in accordance with techniques well known to those skilled in the art.

What is claimed is:
1. As new compositions of matter, ureas represented by the formula:

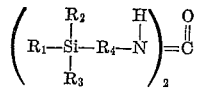

wherein $R_1$ represents an aryl radical, $R_2$ and $R_3$ represent a radical selected from the group consisting of alkyl and aryl radicals and $R_4$ represents an alkylene radical and wherein said alkyl and alkylene radicals contain from 1 to 18 carbon atoms.

2. 1,3-bis(dimethylphenylsilylmethyl)urea.
3. 1,3-bis(4-chlorophenyl-dimethylsilylmethyl)urea.
4. 1,3-bis(diphenylmethylsilylmethyl)urea.
5. A process for preparing ureas having the formula:

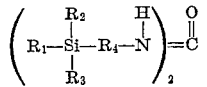

which comprises reacting by mixing at a temperature ranging from about 70° C. to about 150° C. carbonyl sulfide and an amine having the formula:

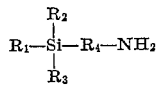

wherein $R_1$ represents an aryl radical, $R_2$ and $R_3$ represent a radical selected from the group consisting of alkyl and aryl radicals and $R_4$ represents an alkylene radical, wherein the alkyl and alkylene radicals contain from 1 to 18 carbon atoms and wherein the carbonyl sulfide is present in an amount in excess of the stoichiometric amount required for the reaction.

6. A process as described in claim 5 wherein the amine is dimethylphenylsilylmethylamine.
7. A process as described in claim 5 wherein the amine is 4-chlorophenyl-dimethylsilylmethylamine.
8. A process as described in claim 5 wherein the amine is diphenylmethylsilylmethylamine.
9. A process as described in claim 5 wherein the amine is triphenylsilylmethylamine.
10. A process as described in claim 5 wherein the amine is β-di(2-nitrophenyl)-phenylsilylpropylamine.

References Cited in the file of this patent

UNITED STATES PATENTS

| | | |
|---|---|---|
| 2,557,803 | Sommer | June 19, 1957 |
| 2,857,430 | Applegath et al. | Oct. 21, 1958 |
| 2,966,507 | Montgomery | Dec. 27, 1960 |

OTHER REFERENCES

Sommer et al.: "Jour. Am. Chem. Soc.," vol. 73 (November 1951), pp. 5130–4.